US011286583B2

(12) United States Patent
Okuda et al.

(10) Patent No.: US 11,286,583 B2
(45) Date of Patent: Mar. 29, 2022

(54) CARBON FIBER BUNDLE AND METHOD OF MANUFACTURING SAME

(71) Applicant: Toray Industries, Inc., Tokyo (JP)

(72) Inventors: Haruki Okuda, Ehime (JP); Tomohisa Noguchi, Ehime (JP); Yusuke Hiraike, Ehime (JP); Fumihiko Tanaka, Ehime (JP)

(73) Assignee: Toray Industries, Inc., Tokyo (JP)

( * ) Notice: Subject to any disclaimer, the term of this patent is extended or adjusted under 35 U.S.C. 154(b) by 473 days.

(21) Appl. No.: 16/314,337

(22) PCT Filed: Jun. 28, 2017

(86) PCT No.: PCT/JP2017/023699
§ 371 (c)(1),
(2) Date: Dec. 28, 2018

(87) PCT Pub. No.: WO2018/003836
PCT Pub. Date: Jan. 4, 2018

(65) Prior Publication Data
US 2019/0226124 A1    Jul. 25, 2019

(30) Foreign Application Priority Data
Jun. 30, 2016    (JP) .............................. JP2016-129739

(51) Int. Cl.
*D01F 9/22*    (2006.01)
*D01D 1/10*    (2006.01)
*D01F 6/18*    (2006.01)

(52) U.S. Cl.
CPC ............... *D01F 9/225* (2013.01); *D01D 1/10* (2013.01); *D01D 1/106* (2013.01); *D01F 6/18* (2013.01); *D01F 9/22* (2013.01); *D10B 2321/10* (2013.01)

(58) Field of Classification Search
None
See application file for complete search history.

(56) References Cited

U.S. PATENT DOCUMENTS

2001/0024722 A1    9/2001  Matsuhisa et al.
2010/0003515 A1    1/2010  Tanaka et al.

FOREIGN PATENT DOCUMENTS

| CN | 103145915 A | 6/2013 |
| CN | 105671668   * | 6/2016 |
| JP | 58-220821 A | 12/1983 |
| JP | 59-88924 A  | 5/1984 |
| JP | 8-6210 B2   | 1/1996 |
| JP | 11-241230 A | 9/1999 |
| JP | 2004-27396 A | 1/2004 |

(Continued)

OTHER PUBLICATIONS

Machine translation of JP2009209487 (Year: 2009).*
(Continued)

*Primary Examiner* — Shawn Mckinnon
(74) *Attorney, Agent, or Firm* — DLA Piper LLP (US)

(57) ABSTRACT

A carbon fiber bundle is characterized in that a ratio (n/N) of a number n of pairs wherein a flaw of 50 nm in size or more is present on at least one of the fracture surfaces forming the pair to a total number N of pairs of fiber fracture surfaces selected at random after performing a single fiber tensile test for a gauge length of 10 mm is 35% or less, and in that a single-fiber diameter d is 4.3 µm or more.

5 Claims, 1 Drawing Sheet

(56) References Cited

FOREIGN PATENT DOCUMENTS

| | | | |
|---|---|---|---|
| JP | 2009-209487 A | | 9/2009 |
| JP | 2009209487 | * | 9/2009 |
| JP | 2009-235662 A | | 10/2009 |
| JP | 2009-249798 A | | 10/2009 |
| JP | 2012-197548 A | | 10/2012 |
| JP | 5907321 B1 | | 4/2016 |
| WO | 97/45576 A1 | | 12/1997 |
| WO | 2008/047745 A1 | | 4/2008 |

OTHER PUBLICATIONS

Machine translation of CN105671668 (Year: 2016).*
Van den Heuvel, P. W. J. et al., "Analysis of stress concentrations in multi-fibre microcomposites by means of Raman spectroscopy," *Journal of Materials Science Letters*, 1996, vol. 15, pp. 1908-1911.

* cited by examiner

CARBON FIBER BUNDLE AND METHOD OF MANUFACTURING SAME

TECHNICAL FIELD

This disclosure relates to a high-quality and high-strength carbon fiber bundle, and a method of manufacturing the same. More specifically, this disclosure relates to a high-quality and high-strength carbon fiber bundle, in which the single-fiber diameter and flaws serving as fracture origins are controlled within a certain range.

BACKGROUND

Because carbon fibers have higher specific strength and specific modulus compared to other fibers, they are widely deployed as reinforcing fibers for composite materials for use in not only conventional sports applications and aerospace applications, but also general industrial applications such as automobile, civil engineering and construction, pressure vessel and windmill blade ones. There are strong needs for higher performance and lower cost for carbon fibers.

Among carbon fibers, the most widely used polyacrylonitrile carbon fiber is industrially manufactured generally as follows. A spinning solution including a polyacrylonitrile (co)polymer that will become a precursor is subjected to wet spinning, dry spinning or dry-jet wet spinning, thereby producing a precursor fiber bundle for carbon fiber. Then, the bundle is heated in an oxidizing atmosphere at a temperature of 180 to 400° C. so that it is converted into a stabilized fiber bundle. Further, the stabilized fiber bundle is heated in an inert atmosphere at a temperature of at least 1000° C. to undergo carbonization, thereby producing a carbon fiber.

The carbon fiber is a brittle material, and fine flaws cause strength reduction. Accordingly, utmost efforts have been made to reduce flaws that may cause fracture. Specifically, it has been disclosed to control the presence state of flaws on carbon fiber within a specific range. For example, Japanese Examined Patent Publication No. 8-6210 discloses that when a single fiber tensile test is performed for a gauge length of 50 mm and the recovered fracture surface is observed with a scanning electron microscope, it is advantageous for increasing the strength that among various types of flaws observed at that time, fracture due to internal voids is 10% or less and fracture due to surface flaws such as attached substances or nicks is 70% or less. In addition, WO 97/45576 and Japanese Patent Laid-open Publication No. 11-241230 disclose that it is advantageous for increasing the strength that the ratio of fracture due to "macro flaw" is 50% or less. The term "macro flaw" is defined as a flaw observed when the gauge length of fiber is of 50 mm, which flaw has a definite shape such as damage, attached substance, dent, axial streak or internal void, and has a size of 100 nm or more. In addition, Japanese Patent Laid-open Publication No. 58-220821 discloses that flaws due to attached substances are controlled to 15% or less when 50 mm gauge length is evaluated as well.

To reduce flaws and bring about the aforementioned presence state of flaws, Japanese Examined Patent Publication No. 8-6210 discloses filtering a spinning solution in two stages using a stainless steel fiber filter and a glass filter, and applying to a carbon fiber obtained from the solution a special electrolytic surface treatment. WO 97/45576 discloses that using a specific copolymerizing component and an oil agent produces a high-strength carbon fiber even when the fiber diameter is large. Japanese Patent Laid-open Publication No. 11-241230 proposes reducing the flaw-containing fiber surface area itself by reducing the diameter of carbon fiber, in addition to three-stage filtration of a spinning solution, filtration of bath liquid or steam for use in a spinning process, and dust removal in a stabilization as well as a pre-carbonization furnace. In addition, Japanese Patent Laid-open Publication No. 58-220821 proposes filtering a spinning solution through a filter having an opening of 5 µm or less, and filtering the atmosphere in an oxidation oven through a filter having an opening of 1 µm or less. Furthermore, Japanese Patent Laid-open Publication No. 59-88924 proposes filtering a spinning solution using a filter having a filtering performance for removing 95% or more of dust having a particle diameter of 5 µm or more when filtering the air. Furthermore, Japanese Patent Laid-open Publication No. 2004-27396 proposes a multistage-filtration method including gradually reducing the opening diameter.

Japanese Examined Patent Publication No. 8-6210, WO 97/45576 and Japanese Patent Laid-open Publication No. 11-241230 disclose that it is effective to increase the strength by controlling the presence state of flaws on the fracture surface recovered when a single fiber tensile test is performed for a gauge length of 50 mm within a specific range. Unfortunately, only controlling the flaw state at 50 mm gauge length within a specific range does not necessarily raise the tensile strength of resin-impregnated strands ("tensile strength of strands") that is a measure commonly used to express the tensile strength of carbon fiber to a higher level. Accordingly, it could be helpful to produce a high-strength carbon fiber by reducing flaws which may cause fracture.

In addition, in Japanese Examined Patent Publication No. 8-6210, it is possible to effectively remove flaws on the carbon fiber surface by electrolytic treatment. However, the electrolytic treatment should be intensely performed to remove flaws. Accordingly, such a treatment requires so long an electrolytic treatment bath that industrial application is difficult. Furthermore, a brittle layer is formed on the carbon fiber surface by intense electrolytic treatment, which layer tends to decrease the composite property. As disclosed in Japanese Patent Laid-open Publication No. 11-241230, a technique including decreasing the surface area of single fiber by fining the same, thereby reducing the number of flaws per unit length is effective to improve the tensile strength. However, as the diameter of fiber decreases, fuzz generated in the spinning process tends to increase and the quality of precursor fiber bundle for carbon fiber tends to deteriorate. Moreover, the effect of increasing the strength when the contribution of fiber fining is subtracted, in other words the degree of reduction of flaws on account of densification, cleaning or the like is insufficient.

In addition, as disclosed in Japanese Patent Laid-open Publication No. 58-220821 and Japanese Patent Laid-open Publication No. 59-88924, in a method including merely reducing the opening diameter of filter or increasing the filtering performance, the filter rapidly clogs and the filtration pressure elevation rate for filter remarkably increases. In other words, unfortunately, the life of the filter is short, and it is necessary to stop spinning every time the filter is exchanged. Furthermore, according to the method of Japanese Patent Laid-open Publication No. 2004-27396, because filtration is performed in multiple stages, an extra space for installing a filter device is required so that mass production becomes difficult in a limited space.

SUMMARY

We thus provide a carbon fiber bundle characterized in that a ratio (n/N) of a number n of pairs wherein flaws on fracture surface of 50 nm in size or more are present on at least one of the fracture surfaces forming the pair to the total number N of pairs of fiber fracture surfaces selected at random after performing a single fiber tensile test for a gauge length of 10 mm is 35% or less, and in that the mean single-fiber diameter is 4.3 µm or more.

The carbon fiber bundle has high-quality and high-strength without the need for fiber fining.

DESCRIPTION OF REFERENCE SIGNS

A: Fracture origin

DETAILED DESCRIPTION

Figure 1:
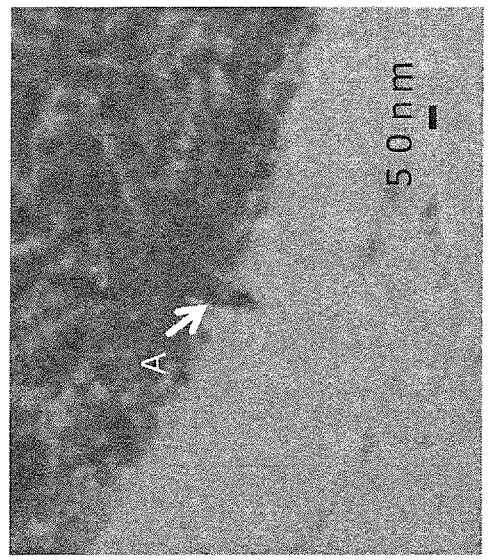
FIG. 1 is a scanning electron microscopic (SEM) image of a fracture surface of a carbon fiber. Radial streaks that converge to one point are confirmed.

Tensile fracture of carbon fiber is known to start with a flaw as an origin. Examples of a flaw which serves as a fracture origin of carbon fiber include a void in fiber, damage, dent and attached substance present on the fiber surface, and adhesion mark remaining after single fibers are adhered to each other by heat in a heat treatment and then separated from each other. These morphological features that can be observed with scanning electron microscopic (SEM) observation are collectively referred to as "flaws for fracture origin", without particularly distinguishing all of these. We found that after performing a single fiber tensile test for a gauge length of 10 mm, if the ratio (n/N) of the number n of pairs in which a flaw of 50 nm in size or more is present on at least one of the fracture surfaces forming the pair to the total number N of pairs of fiber fracture surfaces selected at random is 35% or less, the tensile strength of carbon fiber bundle, specifically the tensile strength of strands that is one type of the unidirectional composite tensile strength is greatly increased. The ratio (n/N) is preferably 30% or less, more preferably 25% or less. It is important to adjust the gauge length to 10 mm. We found that, in the same manner as above, for longer, for example, 50 mm gauge length, the examined probability of presence of flaws having an arbitrary size or larger is not necessarily correlated to the tensile strength of strands. The reason why it is effective to adjust the gauge length to 10 mm is believed to be because the gauge length that governs the tensile strength of strands is shorter than 10 mm. Generally, carbon fibers contain various flaws of different origin among fibers. Therefore, when a carbon fiber having a certain gauge length is taken out, it contains some flaws that potentially fracture at various strengths. In addition, once the tensile fracture of carbon fiber begins, it will not stop but will proceed until the fiber is completely broken. Accordingly, it is generally accepted that the tensile strength of carbon fiber is determined based on the weakest flaw present in a certain gauge length, as with many other brittle materials. In other words, the weakest flaw at 10 mm gauge length may essentially be different from the weakest flaw for another gauge length, for example, 50 mm. When performing a single fiber tensile test for a gauge length of 10 mm, if the ratio n/N is 35% or less, flaws affecting the unidirectional composite tensile strength including the tensile strength of strands are effectively reduced and, as a result, the unidirectional composite tensile strength including the tensile strength of strands reaches a higher level.

A single fiber is broken through a tensile test, and the fracture surface is observed using a scanning electron microscope (SEM) as follows to identify flaws. The single fiber tensile test is performed at a tensile speed of 0.4 mm/min in a liquid such as water for a gauge length of 10 mm. Then, the broken fiber is recovered. The fracture surface is a fracture surface first generated by tensile fracture of the single fiber ("original fracture surface"), and it does not include a fracture surface generated by recoil after the fracture ("secondary fracture surface"). A description is made below of a method of determining the secondary fracture surface. To efficiently recover the broken fiber, the single fiber tensile test is performed in water or in a liquid such as glycerin having higher viscosity. Next, the fracture surface of the recovered fiber is observed with SEM. To observe fine flaws of 50 nm with high accuracy, conductive coating which may cause surface irregularities is not performed, and a field emission (FE)-SEM is used for observation at an accelerating voltage of 1 keV. By setting the accelerating voltage to 1 keV, it is possible to reduce penetration depth of primary electrons into a sample and observe fine surface irregularities as they are. The accelerating voltage may be set smaller. However, when the voltage is too small, the amount of generated secondary electrons decreases and, as a result, sharpness of observed image may be impaired. Accordingly, as long as observation is performed with a general-purpose field emission scanning electron microscope (FE-SEM), the accelerating voltage is preferably 1 keV. The observation is performed at a magnification of 25,000 to 50,000.

After setting the observing condition for FE-SEM as described above, to reliably capture fine flaws, observation is performed at an angle by which the fracture origin is obliquely looked down. Specifically, observation is performed at an angle by which the fracture origin is obliquely looked down by adjusting the fracture origin to face this side by stage operation, and further inclining the fracture surface such that the angle formed between the direction of radiation of the electron beam and the fiber axis is 25 to 300.

Furthermore, it is important to always observe both fracture surfaces to not generate counting loss of flaws, because even when one side of a pair of simultaneously generated fracture surfaces has no morphological feature or no flaw of 50 nm in size or more, another side sometimes has a flaw of 50 nm in size or more. Accordingly, when only one side of a pair of fracture surfaces generated by performing a single fiber tensile test is recovered, the pair is excluded from the object to be observed. In addition, to achieve statistically highly accurate evaluation, it is necessary to observe at least 30 pairs of fracture surfaces, that is, 60 fracture surfaces.

A description is made of a method of determining whether a flaw of 50 nm in size or more is present. First, the position of fracture origin is specified from the observed image obtained as described above. Because carbon fiber is a brittle material, when it is broken through a tensile test, a plurality of streaks radially extending from the fracture origin are usually formed. A point on which such streaks intercross each other at one place is the fracture origin. This is common where the fracture occurs from inside the fiber or where the fracture occurs from the fiber surface. Next, it is recognized whether the fracture origin has some morphological feature compared to the surroundings. The morphological feature includes damage, dent, attached substance, and anything that can be visually observed as a change in image brightness in the image for observation obtained by the method described above. Finally, the size of the morphological feature is evaluated. As the size of the morphological feature, the length of the arc recognized by a portion on which the morphological feature observed on the fracture surface intersects with the circumference of the fracture surface of the fiber is adopted. When fracture occurs from inside the fiber, the diameter of the circumscribed circle in the morphological feature of the fracture origin present within the fiber is regarded as the size of the morphological feature, regardless of the circumference of the fiber. These lengths are quantified by reading the image by image analysis software and using a tool similar to a ruler tool. In addition, even when the morphological feature of flaw elongates in a direction of the fiber axis, as the size of the morphological feature, the length of the arc recognized by a portion on which the morphological feature observed on the fracture surface intersects with the circumference of the fracture surface of the fiber is adopted.

When no streak is recognized on the fracture surface, a streak is recognized on the fracture surface, but the vicinity of the fracture origin is so dirty that it cannot be observed or the like, analysis of such a pair of fracture surfaces is canceled, and another pair of fracture surfaces is additionally observed with SEM. Accordingly, at least 30 pairs of fracture surfaces, that is, 60 fracture surfaces are evaluated. From such an evaluation, the ratio (n/N) is calculated by dividing the "number n of pairs in which a flaw of 50 nm in size or more is present on at least one of the fracture surfaces forming the pair" by the "total number N of pairs of fiber fracture surfaces selected at random".

To produce the carbon fiber bundle, only publicly known techniques such as filtration of polymerizing raw material or spinning solution, environmental cleaning in spinning process, environmental cleaning in heat treatment process and application of oil agent to suppress adhesion are insufficient so that, in addition to these techniques, further suppression of flaws is necessary. We found that the carbon fiber bundle can be obtained by manufacturing and using a precursor fiber bundle for carbon fiber according to a method described later. The method of manufacturing a precursor fiber bundle for carbon fiber described later is merely an example, and does not limit the method of manufacturing our carbon fiber bundle.

The carbon fiber bundle has a single-fiber diameter d of 4.3 µm or more, preferably 4.7 µm or more, more preferably 5.0 µm or more, even more preferably 5.5 µm or more. When the single-fiber diameter of the precursor fiber bundle for carbon fiber that is a base material of the carbon fiber bundle is reduced to reduce the single-fiber diameter of the carbon fiber bundle, the fuzz generating amount in the extruding process tends to increase, and thus the quality of the fiber bundle composed of the precursor for carbon fiber tends to deteriorate. When the single-fiber diameter is 4.3 µm or more, the increase in fuzz generating amount in the extruding process is not significant, and the deterioration in quality can be suppressed. When the single-fiber diameter is 5.0 µm or more, fuzz is easily suppressed throughout the manufacturing process for carbon fiber bundle, and the quality of carbon fiber bundle tends to be enhanced. In addition, as the single-fiber diameter is larger, the surface area of the single fiber on which flaws are present is larger so that when the absolute number of flaws increases, the strength tends to decrease. However, high tensile strength can be maintained by adjusting the ratio (n/N) to 35% or less when performing a single fiber tensile test for a gauge length of 10 mm. The upper limit of the single-fiber diameter is not particularly defined, but the limit is around 10 µm, from the viewpoint of uniform reactivity in the stabilization process. The single-fiber diameter d of the carbon fiber bundle can be more easily controlled by the single-fiber fineness of the precursor fiber bundle and by controlling the stretching ratio in heat treatment described later.

The carbon fiber bundle preferably has a tensile strength of strands of 8.0 GPa or more, more preferably 8.5 GPa or more, even more preferably 8.6 GPa or more. As the tensile strength of strands is higher, the unidirectional composite tensile strength is more easily raised. In addition, as the tensile strength of strands is higher, the number of flaws present in the carbon fiber is often smaller so that as the strength is higher, it is often necessary to progressively reduce small flaws. Accordingly, as the tensile strength of strands is higher, based on publicly known techniques such as filtration of polymerizing raw material or spinning solution, environmental cleaning in spinning process, environmental cleaning in heat treatment process and application of oil agent to suppress adhesion, the strength improving effect tends to be saturated. Conversely, even when a technique that can reduce smaller flaws is applied, if the number of large flaws is relatively large, the strength improving effect is sometimes small. When the tensile strength of strands is 8.0 GPa or more, the strength improving effect tends to be exhibited by adopting the method of manufacturing a carbon fiber bundle described later.

The carbon fiber bundle preferably has a specific gravity of 1.78 or more and 1.85 or less, more preferably 1.79 or more and 1.84 or less. The smaller specific gravity of the carbon fiber bundle contributes to weight saving. However, when the specific gravity is too small, the physical properties are sometimes difficult to exhibit due to degradation of the denseness. When the specific gravity is 1.78 or more, it is advantageous in exhibiting the physical properties. When the specific gravity is 1.79 or more, it is easy to control the tensile strength to a higher level. On the other hand, when the specific gravity is too high, the anisotropy is also too high and thus the tensile strength sometimes decreases. When the specific gravity is 1.85 or less, the tensile strength is easily exhibited. When the specific gravity is 1.84 or less, it is easy to improve the balance between the anisotropy and tensile strength. Those skilled in the art can easily control the specific gravity of carbon fiber bundle depending on the temperature condition for heat treatment.

When the Raman spectrum is measured while applying a uniaxial tensile stress σ to the single fiber, the carbon fiber bundle preferably has an applied stress dependence $\Delta\omega/\Delta\sigma$ of the peak top position ω of the G band appearing around 1600 $cm^{-1}$ that is derived by dividing a difference between peak top positions when the stress is not applied and when the stress is applied by the applied stress of 2.0 $cm^{-1}$/GPa or more. More preferably it is 2.3 $cm^{-1}$/GPa or more, still more preferably 2.5 $cm^{-1}$/GPa or more. It is known that the Raman spectrum of carbon fiber has characteristic peaks, D band and G band, around 1350 $cm^{-1}$ and 1600 $cm^{-1}$, respectively. In addition, because the peak top position of the Raman band of carbon fiber shifts under a stress, evaluation has long been performed of the stress state of carbon fiber using the shifting amount of the peak top position (P. W. J.

Van den Heuvel, Journal of Materials Science Letters, 1996, 1908-1911). The applied stress dependence can be evaluated by measuring the Raman spectrum of the single fiber surface at each stage while gradually increasing the tensile load under a condition where the tensile load on the single fiber can be detected by a load cell or the like, and calculating peak top position on the G band. The tensile load may be applied up to about 50% of the mean fracture load to the single fiber as a guide. When the load is below 50%, the $\Delta\omega/\Delta\sigma$ is almost constant. When it is not constant, a load corresponding to 50% of the mean fracture load of the single fiber is adopted.

Such applied stress dependence may be possibly lowered by performing a treatment such as an electrolytic treatment on the carbon fiber. Although this reason has not been completely clarified, it is expected that a brittle layer formed on the carbon fiber surface by an intense electrolytic treatment decreases the stress bearing ability of the carbon fiber surface and thus decreases an apparent peak top position shift against the applied stress. Because the formed brittle layer may adversely affect the properties when incorporated into a composite, it is preferable to minimize formation of the brittle layer. When the Raman spectrum is measured while applying a uniaxial tensile stress σ to the single fiber, if the $\Delta\omega/\Delta\sigma$ on the G band appearing around 1600 cm$^{-1}$ is 2.0 cm$^{-1}$/GPa or more, formation of the brittle layer can be negligible.

The carbon fiber bundle preferably has a product (E×d/W) of the ratio (d/W) of the single-fiber diameter (d) to the loop diameter (W) just before loop fracture evaluated by a single-fiber loop test, and the tensile elastic modulus (hereinafter the "tensile modulus of strands") (E) evaluated by a tensile test for resin-impregnated strands of 14.6 GPa or more, more preferably 15.5 GPa or more. The single-fiber loop test is a technique of examining the relation between the strain applied to a single fiber by deforming the single fiber into a loop shape and the fracture behavior such as single-fiber fracture or buckling. When a single fiber is deformed into a loop shape, compressive strain is applied to inside the single fiber and tensile strain is applied to outside the single fiber.

Compressive buckling occurs before tensile fracture so the single-fiber loop test has been conventionally often used as a method of testing the single fiber compression strength of carbon fiber. A value that is said to be a reachable tensile strength of carbon fiber can be evaluated by evaluating the tensile strain at the time of tensile fracture. In other words, d/W is a value proportional to the tensile strain, and the product of this value and the tensile modulus of strands E (details will be described later) can be said to be a value corresponding to the tensile strength. Even when the tensile strength of strands of carbon fiber is merely increased, the tensile strength of carbon fiber-reinforced composites may not be increased, but when such E×d/W is increased, the tensile strength of carbon fiber-reinforced composites may be effectively increased. There is no particular limitation on the upper limit of such E×d/W, but the upper limit of E×d/W is sufficient to be 19.0 GPa. Such a parameter can be controlled using the method of manufacturing a carbon fiber bundle described below.

Hereinafter, a description is made of an example of the method of manufacturing a carbon fiber bundle.

A precursor fiber bundle for carbon fiber as the base of the carbon fiber bundle can be obtained by spinning a spinning solution of polyacrylonitrile (co)polymer. On this occasion, effectively removing foreign substances from the spinning solution by performing filtration under a specific condition allows a carbon fiber bundle obtained by heat-treating such a precursor fiber bundle for carbon fiber to be a high-strength carbon fiber bundle with few flaws. Heat-treating usually includes a stabilization process, pre-carbonization process and carbonization process.

As the polyacrylonitrile (co)polymer, not only a homopolymer obtained from acrylonitrile alone, but also a polyacrylonitrile copolymer that uses other monomers in addition to acrylonitrile as a main component may also be used. Specifically, the polyacrylonitrile copolymer preferably contains 90 to 100% by mass of acrylonitrile and less than 10% by mass of copolymerizable monomer.

As monomers copolymerizable with acrylonitrile, acrylic acid, methacrylic acid, itaconic acid, alkali metal salts, ammonium salts and lower alkyl esters thereof, acrylamide and derivatives thereof, allylsulfonic acid, methallylsulfonic acid and salts or alkyl esters thereof, and the like can be used.

The polyacrylonitrile (co)polymer is dissolved in a solvent in which a polyacrylonitrile (co)polymer is soluble such as dimethylsulfoxide, dimethylformamide, dimethylacetamide, nitric acid, aqueous solution of zinc chloride, or aqueous solution of sodium thiocyanate to prepare the spinning solution. When solution polymerization is used to manufacture the polyacrylonitrile (co)polymer, it is preferable that the solvent used for polymerization be the same as a solvent for spinning, because processes of separating the obtained polyacrylonitrile (co)polymer and redissolving it in a solvent for spinning are unnecessary.

Prior to spinning the spinning solution as described above, it is also preferable to pass the spinning solution through a filter device to remove the polymer raw material and impurities mixed in each process. The filter device means a facility to filter and remove foreign substances present in the spinning solution, composed of an inflow path to introduce the spinning solution to be subjected to filtration into the filter device, a filter medium to filter the spinning solution, an outflow path to guide the filtered spinning solution to outside the filter device, and a container to contain them. The filter medium is a means to filter a spinning solution contained in the filter device.

As the form of the filter medium, a leaf disc type, candle type, pleated candle type or the like is used. The filter medium of the candle type or pleated candle type has constant curvature, whereas the leaf disc type filter can use the filter medium in a substantially planar form so that this is advantageous because it has an advantage that the pore diameter distribution hardly spreads and the cleaning property is easily maintained.

The filter medium is a portion that plays a direct role in removing foreign substances present in the spinning solution, and is required to hold the determined opening diameters with narrow variations. In addition, chemical stability to a substance to be treated, heat resistance and some degree of pressure resistance are required. As the filter medium, a wire gauze made by weaving metal fibers, glass nonwoven fabric, filter medium made of a sintered metal fiber tissue and the like are preferably used. In addition, the material of the filter medium is not particularly limited as long as it is inert to the spinning solution and contains no elutable component into the solvent, but from the viewpoint of strength and price, metals are preferable. As the specific metals, in addition to stainless steel (SUS304, SUS304L, SUS316, SUS316L and the like), "INCONEL" (registered trademark) and "HASTELLOY" (registered trademark), various alloys based on nickel, titanium and cobalt are selected. Methods of manufacturing metal fibers especially include so-called bundle drawing, in which a large number of wires are collected as a bundle and the diameter is reduced by drawing, then individual wires are separated to reduce the diameter, coiled sheet shaving, chatter vibration shaving and the like. In wire gauze, because it is necessary to be of not fiber bundles but single fibers, it is obtained by a method including repeating wire drawing and heat treatment or the like.

In filtration of the spinning solution, as the opening of the filter medium is smaller, foreign substances in the spinning solution are easily removed, but clogging of the filter medium more frequently occurs. As the removal performance for foreign substances, a "filtration accuracy" is used instead of the opening. The filtration accuracy ($\mu$m) is a particle diameter (diameter) of spherical particles, 95% of which particles can be collected while passing through the filter medium, and is measured according to a method defined by JIS standard (JIS-B 8356-8). In other words, the fact that the filtration accuracy is small and the fact that the filtration accuracy is high are synonymous. In addition, as the filter thickness becomes thicker, foreign substances in the spinning solution are easily removed, but the pressure loss in the filter medium is larger and the stability of the manufacturing process is lower. Although the tendency described above has been known, optimum filtration conditions are different for filter media, and thus any generalizable knowledge has not been obtained for filtration of the spinning solution. Accordingly, at the time of changing the filter medium, it has taken a great deal of time and cost to control the filtration condition.

As an example of the method of manufacturing a carbon fiber bundle, it is preferable to filter the spinning solution under a condition where the filtration speed A (cm/hr) and filtration accuracy B ($\mu$m) of the filter medium, and filter basis weight D (g/m$^2$) satisfy equations (1) and (2):

$$D-600/(\alpha\times\beta)\geq 0 \qquad (1)$$

$$\alpha=1-1/(1+\exp(7-A)) \qquad (2)$$

$$\beta=1-1/(1+\exp(-0.23\times B)) \qquad (3).$$

The filter basis weight D (g/m$^2$) is a total basis weight of a filter medium main body excluding a mesh layer which may be laminated for the purpose of protecting the filter medium main body. The filter basis weight D can be calculated by measuring the mass of the filter medium cut out into an arbitrary area and dividing this mass by the area.

As the filter basis weight D is larger, the trapping rate of foreign substances is higher. Conversely, as the filter basis weight D is smaller, foreign substances cannot be easily caught but tend to slip through. When the influence of the filter basis weight D on improvement of the quality of the precursor fiber bundle for carbon fiber and suppression of clogging of the filter is measured while changing the filtration speed A and filtration accuracy B, we confirmed that there is a minimum filter basis weight that can achieve both improvement of the quality of the precursor fiber bundle for carbon fiber and suppression of clogging of the filter at an arbitrary filtration speed and filtration accuracy (hereinafter "minimum filter basis weight"). According to the results of this experiment, the minimum filter basis weight can be expressed using mutually independent parameters $\alpha$ and $\beta$ as shown in the second term on the left side of equation (1), where $\alpha$ is defined as a function of the filtration speed A shown in equation (2), and $\beta$ is defined as a function of the filtration accuracy B shown in equation (3). As the $\alpha\times\beta$ is larger, the minimum filter basis weight is smaller, and as the $\alpha\times\beta$ is smaller, the minimum filter basis weight is larger.

For movement of the individual variables, as the filtration speed A is larger, $\alpha$ is smaller and the minimum filter basis weight is larger, and as the filtration speed A is smaller, $\alpha$ is larger and the minimum filter basis weight is smaller. Similarly, as the filtration speed B is larger, $\beta$ is smaller and the minimum filter basis weight is larger, and as the filtration accuracy B is smaller, $\beta$ is larger and the minimum filter basis weight is smaller. Although the mechanism by which improvement of the quality of the precursor fiber bundle for carbon fiber and suppression of clogging of the filter can be both achieved by performing filtration under conditions satisfying equations (1) to (3) is not necessarily clarified, we believe it is as follows. In other words, we believe that, as the filtration accuracy is smaller, foreign substances are likely to be caught by a flow path through the filter medium so that foreign substances may be effectively trapped, whereas the filter is likely to clog, but when the filtration speed is sufficiently low, deformation and spreading of foreign substances in the filter medium due to pressure drop are suppressed so that the flow path in the filter medium hardly clogs.

In addition, as an example of the method of manufacturing a carbon fiber bundle, a filter medium with the filtration accuracy B ($\mu$m) satisfying equation (4) can be used:

$$B\geq 3 \qquad (4).$$

When the filtration accuracy B is 3 $\mu$m or more, suppression of clogging of the filter can be made more effective. Although the reason for this phenomenon is not necessarily clarified, we believe it is as follows. Although reducing the filtration speed A can suppress deformation of foreign substances, and thus prevent complete blockage in the flow path through the filter medium due to deformation of foreign substances, as the value of filtration accuracy B is larger, the filtration pressure tends to decrease, and thus the degree of deformation of foreign substances is so small that a filter clogging suppressing effect tends to appear.

The precursor fiber bundle for carbon fiber can be manufactured by spinning the spinning solution filtered as described above by wet spinning or dry-jet wet spinning. In particular, dry-jet wet spinning is preferably used because it allows the properties of polyacrylonitrile (co)polymer having the specific molecular weight distribution described above to be exhibited.

The precursor fiber bundle for carbon fiber is obtained by introducing the spinning solution into a coagulation bath for solidification, and passing the obtained coagulated yarn through a water washing process, bath stretching process, oil agent applying process and drying step. Furthermore, a dry heat stretching process or steam stretching process may be added to the above processes. The coagulated yarn may be directly stretched in bath to omit the water washing process, or may be stretched in bath after removing the solvent by the water washing step. The stretching in bath is preferably performed usually in a single stretching bath or a plurality of stretching baths whose temperature is adjusted to 30 to 98° C.

The mean fineness of single fiber contained in the precursor fiber bundle for carbon fiber is preferably 0.5 dtex or more, more preferably 0.6 dtex or more, further preferably 0.7 dtex or more, most preferably 0.8 dtex or more. As the single-fiber fineness of the precursor fiber bundle is higher, the yarn breakage due to contact with a roller or guide is easily suppressed so that the process stability of the spinning process and heat treatment process for carbon fiber can be easily maintained. When the single-fiber fineness of the precursor fiber bundle is 0.5 dtex or more, it is easy to maintain the process stability, when it is 0.6 dtex or more, it is easier to maintain the process stability, when it is 0.7 dtex or more, it is easy to do so and additionally enhance the productivity, and when it is 0.8 dtex or more, it is possible to perform both of them at a higher level. The single-fiber fineness of the precursor fiber bundle can be controlled by publicly known methods of addressing the amount of stock solution extruded through a spinneret, the stretch ratio and the like.

The obtained precursor fiber bundle for carbon fiber is usually in the form of continuous fibers. In addition, the number of filaments per yarn is preferably 1,000 to 36,000.

The precursor fiber bundle for carbon fiber obtained as described above is subjected to a stabilization process. The stabilization process refers to heat-treating for the precursor fiber bundle for carbon fiber in an oxygen-containing atmosphere at a temperature of 200 to 300° C. In the process of preliminarily carbonizing the fiber bundle obtained in the stabilization process, it is preferable that the obtained stabilized fiber bundle be heat-treated in an inert atmosphere at a maximum temperature of 500 to 1000° C. until the specific gravity becomes 1.5 to 1.8. The stretching ratio in the pre-carbonization process is preferably 1.16 to 1.25, more preferably 1.17 to 1.20. In such a temperature range, flaws of the fibers resulting from a stretching treatment are unlikely to occur, and when the stretching ratio in the pre-carbonization process is 1.16 or more, the formation reaction of initial intermolecular carbonized structure inside the fiber can be promoted and a dense fibrous structure can be formed. As a result, the tensile strength of carbon fiber bundle can be enhanced. When the stretching ratio in the pre-carbonization process is 1.25 or more, yarn breakage may occur due to high tension applied to the pre-carbonization fiber bundle. Accordingly, the stretch ratio is preferably set to 1.25 or less.

It is preferable to carbonize the pre-carbonized fiber bundle in an inert atmosphere at a maximum temperature of 1000 to 3000° C. From the viewpoint of increasing the tensile modulus of strands of the obtained carbon fiber bundle, it is preferable that the maximum temperature of the carbonization process be higher, but when it is too high, the strength of the high-strength area may be lowered, and thus setting is made taking both of them into consideration. The more preferable maximum temperature is 1200 to 2000° C., still more preferably 1200 to 1600° C.

The carbon fiber bundle obtained as described above is subjected to a surface treatment to improve the adhesion with respect to the matrix resin so that a functional group containing an oxygen atom is introduced. As the surface treating method, gas phase oxidation, liquid phase oxidation or liquid phase electrolytic oxidation is used. From the viewpoint that high productivity and uniform treatment can be achieved, liquid phase electrolytic oxidation is preferably used. The liquid phase electrolytic oxidation method is not particularly limited, and may be performed based on a publicly known method.

After such a surface treatment, a sizing treatment may also be performed to impart convergency to the obtained carbon fiber bundle. For the sizing agent, a sizing agent having good compatibility with the matrix resin can be appropriately selected depending on the type of the matrix resin used for a composite material.

EXAMPLES

Hereinafter, a more specific description is made with reference to examples. A description is made of measuring methods used in the examples as follows.

Determination of quality of precursor fiber bundle for carbon fiber

The total number of the number of single-fiber breaks (hereinafter referred to as fuzz) and the number of assemblies of the single-fiber breaks (hereinafter referred to as pill) in a fiber bundle were counted and evaluated in three grades, while running the precursor fiber bundle for carbon fiber composed of 6000 filaments at a speed of 1 m/min. Evaluation criteria are as follows. The evaluation criteria can be matched by setting the number of fuzzes and pills to 1.4 times when the precursor fiber bundle for carbon fiber is composed of 3000 filaments, and setting the number of fuzzes and pills to 0.7 times when the precursor fiber bundle for carbon fiber is composed of 12000 filaments. The values were rounded off by a decimal point or less to produce integer values.

A: 1 or less per 600 m of fiber
B: 2 to 4 per 600 m of fiber
C: 5 to 30 per 600 m of fiber.

Determination of Lifetime of Filter

The passing amount of filtrate per unit filtration area until the pressure loss of filter medium at the time of spinning increased by 1 MPa from the start of filtration was measured, and was evaluated in three grades. Evaluation criteria are as follows.

A: 50 L/cm$^2$ or more
B: 25 L/cm$^2$ or more and less than 50 L/cm$^2$
C: Less than 25 L/cm$^2$.

Tensile Test for Carbon Fiber Strand

The tensile elastic modulus and tensile strength of resin-impregnated carbon fiber strands were determined in accordance with JIS R7608 (2008) "Resin impregnated strand testing method". The tensile elastic modulus was measured within a strain range of 0.1 to 0.6%. Test pieces were prepared by impregnating a carbon fiber bundle with the following resin composition and curing the same under a heat treatment condition at a temperature of 130° C. for 35 minutes.

Resin Composition 3,4-Epoxycyclohexylmethyl-3,4-epoxy-cyclohexane-carboxylate (100 parts by mass)
Boron trifluoride monoethylamine (3 parts by mass)
Acetone (4 parts by mass)

The number of measurements in the tensile test was 6, and the arithmetic mean value from individual measurement results was taken as the tensile modulus of strands and tensile strength of carbon fiber. In the following examples and comparative examples, "BAKELITE (registered trademark)" ERL-4221 manufactured by Union Carbide Corporation was used as above-mentioned 3,4-epoxycyclohexyl-methyl-3,4-epoxy-cyclohexane-carboxylate. The strain was measured using an extensometer.

Determination of Quality of Carbon Fiber Bundle

In the same manner as for the precursor bundle for carbon fiber, the total number of the number of single-fiber breaks (hereinafter "fuzz") and the number of assemblies of the single-fiber breaks (hereinafter "pill") in a fiber bundle were counted and evaluated in three grades, while running the carbon fiber bundle composed of 6000 filaments at a speed of 1 m/min. Evaluation criteria are as follows. The evaluation criteria can be matched by setting the number of fuzzes and pills to 1.4 times when the carbon fiber bundle is composed of 3000 filaments, and setting the number of fuzzes and pills to 0.7 times when the carbon fiber bundle is composed of 12000 filaments. The values were rounded off by a decimal point or less to produce integer values.

A: 1 or less per 600 m of fiber
B: 2 to 4 per 600 m of fiber
C: 5 to 30 per 600 m of fiber.

Probability that a Flaw of 50 nm in Size or More Exists

A tensile test for single fiber was performed in accordance with JIS R7606 (2000). The gauge length was 10 mm, a commercially available cyanoacrylate instant adhesive was used for fixing the carbon fiber to a test piece mount, and a special testing tool designed to perform in water was used for TENSILON "RTC-1210A" manufactured by A&D Company, Limited. Fifty single fibers to be tested were randomly extracted from a fiber bundle. A tensile test was performed on one set of 50 single fibers at a strain rate of 0.4 mm/min to recover both broken fibers as much as possible. When there were less than 30 pairs of broken fibers, the test was additionally performed on one additional set of 50 fibers to recover 30 pairs or more of both broken fibers.

Figure 3:
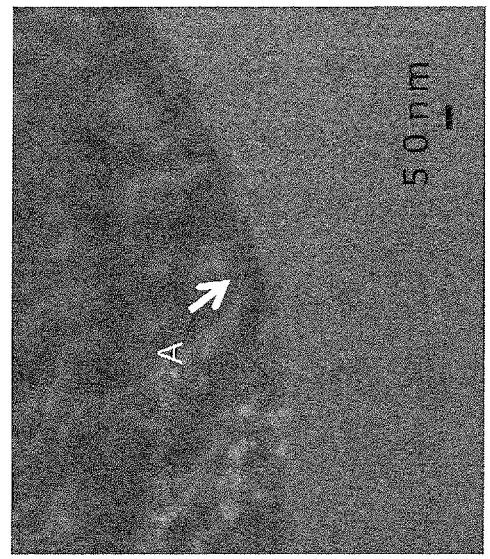
FIG. 3 is an enlarged image in the vicinity of a fracture origin on a fracture surface of another carbon fiber. A flaw due to a dent is confirmed.
Figure 2:
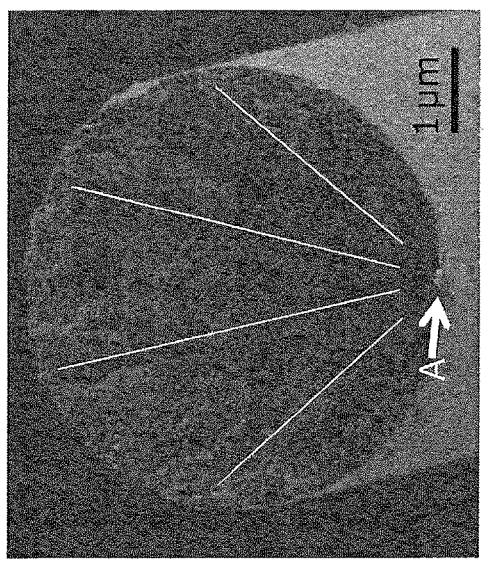
FIG. 2 is an enlarged image in the vicinity of a fracture origin in FIG. 1. A flaw due to an attached substance is confirmed.
Figure 4:
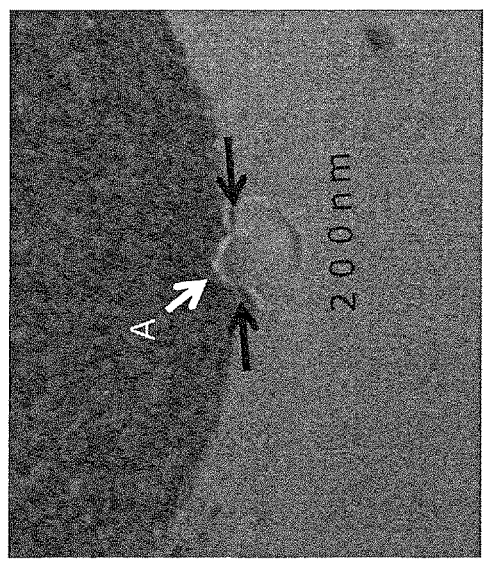
FIG. 4 is an enlarged image in the vicinity of a fracture origin on a fracture surface of another carbon fiber. Noticeable morphological features of 50 nm or more are not confirmed.

The fracture surface of the broken fiber recovered in this way was observed using a scanning electron microscope (SEM) "S-4800" manufactured by Hitachi High-Technologies Corporation. Before the observation, a vapor deposition treatment for applying conductivity was not performed, and the observation was done at acceleration voltage of 1 keV and at a magnification of 25,000 to 50,000. In addition, to make it easy to distinguish the presence or absence of fine flaws, the stage was rotated such that the fracture origin faced the front side, and the stage was tilted by 30° so that the fracture origin was observed from the oblique upside. For example, the directions are shown in FIGS. 1 to 4. From the pairs of broken fibers, 30 pairs were randomly selected for observation.

Because traces of the fracture radially progressing from the fracture origin remained as radial streaks on the original fracture surface caused by tensile fracture of the carbon fiber, a portion on which the streaks present on an SEM observation image converged to one point when traced was identified as the fracture origin. When the streaks could not be recognized or when the streaks could be recognized, but stain was adhered near the fracture origin so that the streaks were hardly observed on at least one side of the fracture surfaces on both sides, the pair of such fracture surfaces were excluded for evaluation. The excluded pairs were appropriately replenished such that 30 pairs of fracture surfaces were eventually observed. Once the fracture origin could be identified, we investigated whether there were any morphological features as flaws. The morphological feature includes dent, attached substance, partly peeled mark on fiber surface, damage and adhesion mark. The length of the arc on a portion that the morphological feature and the periphery of the cross section formed were taken as the size of the flaw. Fracture surfaces having a flaw of 50 nm in size or more were equally classified as the "fracture surface having a flaw of 50 nm in size or more" regardless of the difference in appearance. This classification was performed on both fracture surfaces. When at least one of them was classified as the "fracture surface having a flaw of 50 nm in size or more", the pair was taken as having the "fracture surface having a flaw of 50 nm in size or more". This classification was performed on all 30 pairs of fracture surfaces observed with SEM, and the ratio (n/N) of the number n of pairs in which a flaw of 50 nm in size or more is present on at least one of the fracture surfaces forming the pair to the total number N of pairs of fracture surfaces observed at random was calculated.

Applied stress dependence $\Delta\omega/\Delta\sigma$ of peak top position $\omega$ of G band Single fibers randomly taken from a carbon fiber bundle were fixed to a small tensile jig equipped with a micrometer and load cell such that the gauge length was 10 mm, and then placed on a sample stage of a laser Raman spectrophotometer "NRS-3200" manufactured by JASCO Corporation. Then, the excitation light was set at a wavelength of 534.5 nm and the objective lens set at a magnification of 50, and the stage height adjusted so that the laser was focused on the carbon fiber surface. Raman spectrum before load application was measured under measurement conditions of an exposure time of 20 seconds and integration number of 6 times. Raman spectra were measured under the above conditions at each load level while changing the load level stepwise using a micrometer. The diameters of the measured single fibers were separately obtained by scanning electron microscopic observation. Each diameter is referred to as an "individual single-fiber diameter". Using the individual single-fiber diameter, the load was converted into a stress. The Raman spectrum at each obtained stress was analyzed to calculate the peak top position of the G band present around 1600 $cm^{-1}$. The peak top position was plotted with respect to the stress and the applied stress dependence $\Delta\omega/\Delta\sigma$ ($cm^{-1}$/GPa) of the peak top position of the G band was calculated by linear approximation. The measurement was performed 3 times, and the $\Delta\omega/\Delta\sigma$ was taken as a mean value among them.

Individual Single-Fiber Diameter

SEM observation of the fracture surface of a single fiber was performed at a magnification of 5000 in the fiber axis direction and the diameter was measured using an open source image processing software "image J". The fracture surface was formed by tensile fracture of the single fiber. Measurement of the diameter was calculated by determining the center of the single fiber by eye measurement, drawing two straight lines that passed through the center and were mutually orthogonal, reading the point where such straight lines crossed the outer periphery of the single fiber to obtain two diameter readings, and simply averaging them.

Mean Single-Fiber Diameter

This was performed in accordance with JIS R7607 (2000). Specifically, the mass $A_f$ (g/m) and specific gravity $B_f$ (−) per unit length of the carbon fiber bundle composed of a large number of carbon filaments to be measured were determined. The mean single-fiber diameter d ($\mu$m) of the carbon fiber bundle was calculated from the obtained values of $A_f$ and $B_f$ and the number of filaments $C_f$ of the carbon fiber bundle to be measured using the following equation:

$$\text{Mean single-fiber diameter (}\mu\text{m)} = ((A_f/B_f/C_f)/\pi)^{(1/2)} \times 2\times10^3.$$

Measurement of Specific Gravity of Carbon Fiber

One meter of the fiber bundle to be measured was sampled and measured by the Archimedes method using o-dichloroethylene as a specific gravity liquid. The measurement was performed 3 times, and the mean value was used.

Single-Fiber Loop Test

A loop was formed in the center of a single fiber by placing the single fiber of about 10 cm in length on a glass slide, applying 1 to 2 drops of glycerin on the center, and lightly twisting both ends of the single fiber in the circumferential direction of the fiber, and then a cover glass was placed on the top of the loop. This was mounted on a stage of the microscope, and moving image shooting was performed under a condition where the total magnification was 100 and the frame rate was 15 frames/second. Until the single fiber broke, distortion was applied by pressing both ends of the looped fiber in the slide glass direction with fingers, and pulling them in the opposite direction at a constant speed, while adjusting the stage every time such that the loop was not out of the visual field. Frame just before loop fracture was specified by frame advance, and the lateral width W (μm) of the loop just before loop fracture was measured by image analysis. The mean single-fiber diameter d (μm) was divided by W to calculate d/W. The test was performed 20 times, the mean value of d/W determined, and this value multiplied by the tensile modulus of strands (GPa) to produce E×d/W.

Example 1

A monomer composition composed of 99.0% by mass of acrylonitrile and 1.0% by mass of itaconic acid was polymerized by solution polymerization using dimethylsulfoxide as a solvent to produce a spinning solution containing a polyacrylonitrile copolymer. The obtained spinning solution was flowed into a filter device and filtration performed. The filter medium used was a metal sintered filter having a filtration accuracy B of 1 μm, filter thickness C of 800 μm, and filter basis weight D of 2500 g/m², and filtration was performed under a filtration condition with a filtration speed A of 3 cm/hour. A coagulated yarn was obtained by dry-jet wet spinning in which the filtered spinning solution was extruded through a spinneret into the air and then introduced into a coagulation bath composed of an aqueous solution of dimethylsulfoxide. Further, after the coagulated yarn was washed with water, it was stretched at a bath stretching ratio in bath of 3 in hot water at 90° C., a silicone oil agent additionally applied, drying was performed using a roller heated to a temperature of 160° C., and pressurized steam stretching was performed with a stretching ratio of 4 so that a precursor fiber bundle for carbon fiber having a single-fiber fineness of 0.7 dtex was obtained. Table 1 shows the spinning results, filter spec, determination results under equations (1) and (4), and spinning results.

Next, with reference to the description of Japanese Examined Patent Publication No. 5907321, a stabilized fiber bundle was obtained by performing a stabilization treatment on a precursor fiber bundle for carbon fiber with a stretching ratio of 1 in an air atmosphere oven, including a first stabilization process under conditions of a stabilization temperature of 250° C. and stabilization time of 11 minutes and a second stabilization process under conditions of a stabilization temperature of 281° C. and stabilization time of 6 minutes. At this time, the ratio of the peak intensity at 1453 $cm^{-1}$ to the peak intensity at 1370 $cm^{-1}$ evaluated in the infrared spectrum for the fiber bundle at the end of the first stabilization process was 1.04, the ratio of the peak intensity at 1453 $cm^{-1}$ to the intensity at 1370 $cm^{-1}$ evaluated in the infrared spectrum for the fiber bundle at the end of the second stabilization process was 0.70, and the ratio of the peak intensity at 1254 $cm^{-1}$ to the peak intensity at 1370 $cm^{-1}$ in the infrared spectrum was 0.61.

The obtained stabilized fiber bundle was subjected to a pre-carbonization treatment while being stretched in a nitrogen atmosphere at a maximum temperature of 800° C. at a stretching ratio of 1.17 to produce a pre-carbonized fiber bundle. The obtained pre-carbonized fiber bundle was carbonized while being stretched in a nitrogen atmosphere at a maximum temperature of 1500° C. at a stretching ratio of 0.98 to produce a surface untreated carbon fiber bundle. The obtained surface untreated carbon fiber bundle was subjected to a surface treatment and a sizing agent application treatment to prepare a final carbon fiber bundle. This physical property is shown in Table 2.

Example 2

A precursor fiber bundle for carbon fiber and carbon fiber bundle were obtained in the same manner as in Example 1, except that the filter medium was changed to a metal sintered filter having a filtration accuracy B of 9 μm, filter thickness C of 3200 μm, and filter basis weight D of 6400 g/m².

Comparative Example 1

A precursor fiber bundle for carbon fiber and carbon fiber bundle were obtained in the same manner as in Example 1, except that the filter medium was changed to a metal sintered filter having a filtration accuracy B of 10 μm, filter thickness C of 1600 μm, and filter basis weight D of 3200 g/m².

Example 3

A precursor fiber bundle for carbon fiber and carbon fiber bundle were obtained in the same manner as in Example 1, except that the filtration speed A was changed to 6 cm/hour and the number of holes in the spinneret was changed to 3000 in the filtration condition.

Comparative Example 2

A precursor fiber bundle for carbon fiber and carbon fiber bundle were obtained in the same manner as in Example 3, except that the filter medium was changed to a metal sintered filter having a filtration accuracy B of 9 μm, filter thickness C of 3200 μm, and filter basis weight D of 6400 g/m².

Example 4

A precursor fiber bundle for carbon fiber and carbon fiber bundle were obtained in the same manner as in Example 3, except that the filter medium was changed to a metal sintered filter having a filtration accuracy B of 9 μm, filter thickness C of 6400 μm, and filter basis weight D of 12800 g/m².

Comparative Example 3

A precursor fiber bundle for carbon fiber and carbon fiber bundle were obtained in the same manner as in Example 3, except that the filtration speed A was changed to 12 cm/hour in the filtration condition.

Comparative Example 4

A precursor fiber bundle for carbon fiber and carbon fiber bundle were obtained in the same manner as in Comparative Example 3, except that the filter medium was changed to a metal sintered filter having a filtration accuracy B of 9 μm, filter thickness C of 6400 μm, and filter basis weight D of 12800 g/m².

Reference Example 1

The evaluation results of a carbon fiber bundle described in Example 1 of Japanese Examined Patent Publication No. 8-6210 are shown in Table 2. The manufacturing method is described below.

A copolymer composed of 99.5 mol % of acrylonitrile and 0.5 mol % of itaconic acid was modified with ammonia to prepare a solution in dimethylsulfoxide having a polymer concentration of 20% by mass. This solution was filtered in two stages using a stainless steel fiber filter (fiber diameter: 4 μm) and glass fiber filter (fiber diameter: 0.1 to 3 μm), and then the filtrate adjusted to a temperature of 35° C., extruded into the air through a spinneret having a diameter of 0.15 mm and number of holes of 3000, run in a space of about 3 mm, and then coagulated in a DMSO aqueous solution having a concentration of 30% at a temperature of 5° C. The coagulated yarn was washed with water and stretched to 4 times through a stretching bath in five stages, and a silicone oil agent was applied. Subsequently, the resultant was brought into contact with the surface of a roller heated to 130 to 160° C. for drying and densification and further stretched to 3 times in a pressurized steam at 0.39 MPa to produce a fiber bundle having a single-fiber fineness of 0.88 dtex and total fineness of 2400 dtex.

The obtained fiber bundle was stretched at a rate of 4% in air at 240 to 260° C. until the fiber bundle having a specific gravity of 1.25, and then shrunken by heating in a subsequent area to reach a total stretching ratio of 1.0. As a result, the fiber bundle was turned into a stabilized fiber with a specific gravity of 1.36. Subsequently, the temperature elevation rate in the temperature range of 350 to 450° C. was set to 300° C./min, and the stabilized fiber stretched by 5% in this temperature range. Then, the stabilized fiber was carbonized at a stretching ratio of 0.99 via a driving roller at 900° C. while gradually raising the temperature elevation rate, and further in a nitrogen atmosphere having a maximum temperature of 1850° C. As a result, a carbon fiber was obtained. The temperature elevation rate in the temperature range of 1500 to 1600° C. was 1100° C./min. The obtained carbon fiber was passed through a concentrated nitric acid at 60° C. while being subjected to an electrolytic treatment under a condition where the total electric quantity was 300 C/g, and dried. Then, the dried resultant was heated in a nitrogen atmosphere at 700° C. Such a series of surface treatments was performed to produce a final carbon fiber bundle.

Reference Example 2

The evaluation results of a carbon fiber bundle described in Example 3 of WO 97/45576 are shown in Table 2. The manufacturing method is described below.

A copolymer composed of 96.0 mol % of acrylonitrile, 1.0 mol % of acrylic acid, 1 mol % of n-butyl methacrylate and 2.0 mol % of ethyl acrylate was polymerized by solution polymerization to produce a spinning solution having a concentration of 18%. After polymerization, an ammonia gas was blown until the pH reached 8.5 to neutralize methacrylic acid, and an ammonium group introduced into the polymer to improve the hydrophilicity of the spinning solution. The obtained spinning solution was solidified by dry-jet wet spinning in which the solution was adjusted to 40° C., extruded into the air using a spinneret having a diameter of 0.15 mm and number of holes of 6000, passed through a space of about 4 mm, and then brought into a coagulating bath composed of 35% DMSO aqueous solution controlled at 3° C. The degree of swelling of the obtained coagulated yarn was 220%. The obtained coagulated yarn was washed with water and then stretched in warm water. Four stretching baths were used, and the temperature of the fourth bath was set to 90° C. by raising the temperature by 10° C. from the first bath. The bath stretching ratio in bath was 3.5. To prevent adhesion among single fibers, the fibers were introduced into the bath with a roller on the entrance side being lifted from the bath, and a vibration guide was placed in each bath. The frequency was 25 Hz and the amplitude was 2 mm.

The obtained stretched yarn was passed through an oil agent bath that used an oil agent in which a silicone oil agent composed of amino-modified silicone, epoxy-modified silicone and ethylene oxide-modified silicone was mixed with an emulsion in which fine particles of polymethyl methacrylate crosslinked with divinylbenzene (average particle diameter: 0.1 μm) were emulsified and ammonium carbonate so that the oil agent and fine particles were applied to the fiber. The viscosities of the amino-modified silicone, epoxy-modified silicone and ethylene oxide-modified silicone at 25° C. were 15000 mm$^2$/s, 3500 mm$^2$/s and 500 mm$^2$/s, respectively. Furthermore, a dry densification treatment was performed using a heating roller at 150° C.

The obtained dried and densified yarn was further stretched in a pressurized steam at 0.29 MPa to produce an acrylic fiber having a stretching ratio of 13, single-fiber fineness of 1.1 dtex and filament number of 12000. The final spinning speed was 400 m/min.

The obtained fiber bundle was heated at a stretching ratio of 0.90 in air at 230 to 260° C. so that it was converted into a stabilized fiber having a moisture content of 8%. The obtained stabilized fiber was heat-treated to 1,400° C. at a stretching ratio of 0.92 at a temperature elevation rate of 400° C./min in the temperature range of 300 to 500° C. and temperature elevation rate of 500° C./min in the temperature range of 1000 to 1200° C. in a nitrogen atmosphere. After heat treatment, an anodizing treatment with an electric quantity of 10 C/g was performed in an aqueous solution of ammonium carbonate. The final heat-treatment speed was 10 m/min. Physical properties of the obtained carbon fiber are shown in Table 2.

Reference Example 3

The evaluation results of a carbon fiber bundle described in Example 8 of Japanese Patent Laid-open Publication No. 11-241230 are shown in Table 2. The manufacturing method is described below.

A copolymer composed of 98.8 mol % of acrylonitrile, 0.6 mol % of itaconic acid and 0.6 mol % of isobutyl methacrylate (iBMA) was polymerized by solution polymerization using DMSO as a solvent to produce a spinning solution having a concentration of the copolymer of 13.0% by mass and having an intrinsic viscosity of 3.3. The copolymer solution and solvent were passed through filters having openings of 1 μm, 0.6 μm and 0.2 μm arranged in this order for polymerization. After polymerization, an ammonia gas was blown until the pH reached 9.0 to neutralize itaconic acid, and an ammonium group introduced into the copolymer. Next, the spinning solution was solidified by dry-jet wet spinning in which the solution was adjusted to 30° C., extruded into the air using a spinneret having a hole diameter of 0.10 mm and number of holes of 6000, passed through a space of about 4 mm, and then brought into a coagulating bath composed of an aqueous solution containing 35% by mass of DMSO whose temperature was adjusted to 0° C. The obtained coagulated yarn was washed with water and then stretched in a stretching bath. Four stretching baths were used, and the temperature of the fourth bath was set to 95° C. by raising the temperature by 10° C. from the first bath. At this time, the total stretching ratio was 2.5. To prevent adhesion among single yarns, a roller on the entrance side was placed outside the bath. The degree of swelling of the obtained stretched yarn in bath was 95%.

Subsequently, the stretched yarn in bath was passed through an oil agent bath including 0.4% by mass of a silicone compound composed of amino-modified silicone (oil viscosity: 7500 mm$^2$/s), epoxy-modified silicone (oil viscosity: 10000 mm$^2$/s) and ethylene oxide-modified silicone (oil viscosity: 500 mm$^2$/s) and a water soluble silicone resin (manufactured by Nippon Unicar Company Limited, model number: RZ 7703). Furthermore, after being dried and densified by a heating roller whose temperature was adjusted to 120° C. until the moisture content became 0.5% by mass or less, the yarn was passed through an oil agent bath including 2.0% by mass of a silicone compound composed of amino-modified silicone (oil viscosity: 4500 mm$^2$/s), epoxy-modified silicone (oil viscosity: 7000 mm$^2$/s) and ethylene oxide-modified silicone (oil viscosity: 200 mm$^2$/s), and then dried and densified by a heating roller at 170° C. Subsequently, the yarn was stretched to 4 times in steam having a pressure of 0.59 MPa, and then dried by a heating roller at 180° C. to produce a precursor fiber having a single-fiber fineness of 0.33 dtex. In the spinning process, for example, coagulating bath, washing with water and stretching in bath, pure water having an electric conductivity of 5 μS or less was filtered through a cartridge filter having an opening of 0.8 μm for use. Pressurized steam for heat treatment was filtered through a metal fiber sintered filter having an opening of 1 μm. In the spinning process, an enclosure was provided on the yarn path, the air filtered through a filter having an opening of 0.2 μm was supplied, and the environment was cleaned such that the amount of dust of 0.3 μm or more reached 1000 particles/L or less. The obtained precursor fiber was converted into a stabilized fiber having a fiber specific gravity of 1.34 at a stretching ratio of 1.00 in the air heated at 250 to 280° C. Furthermore, the stabilized fiber was pre-carbonized in a pre-carbonization furnace in which the maximum temperature of a nitrogen atmosphere is 800° C. with the temperature elevation rate in the temperature range of 400 to 500° C. being 100° C./min and stretching ratio being 1.15. Subsequently, the fiber was post-carbonized in a post-carbonization furnace in which the maximum temperature of a nitrogen atmosphere is 1450° C. with the temperature elevation rate in the temperature range of 1000 to 1200° C. being 200° C./min and stretching ratio being 0.99. After completion of heat treatment, an anodizing treatment with an electric quantity of 10 C/g was performed with an aqueous solution of ammonium carbonate. In the heat treatment process, air to be supplied into an oxidation oven was filtered through a filter having an opening of 0.2 μm so that the amount of dust of 0.3 μm or more reached 1000 particles/L or less to clean the environment. In a place where the precursor fiber was supplied to the pre-carbonization furnace, an enclosure was provided on the yarn path, and the environment was cleaned in the same manner.

Reference Example 4

The evaluation results of a commercially available carbon fiber "TORAYCA (registered trademark)" T1100G (manufactured by Toray Industries, Inc.) are shown in Table 2.

In Table 2, comparing Examples 1 to 4 to Comparative Examples 1 to 4, it can be seen that the ratio n/N, which is a parameter focusing on flaws of 50 nm in size or more for 10 mm gauge length, is a good intermediate parameter strongly correlated with the tensile strength. In addition, it can be seen that the ratios n/N for 10 mm gauge length of the carbon fiber bundle of Examples 1 to 4 are much smaller than those of conventional products shown in the reference examples. Furthermore, from Table 1, it can be seen that the ratio n/N can be controlled to 35% or less by taking particular filtration conditions. On the other hand, we confirmed that the ratio n/N for 50 mm gauge length is 60% for Example 1 and 62% for Comparative Example 4, which result in almost no difference. This result indicates that in an area of our carbon fiber where the absolute number of flaws is small, the tensile strength of strands cannot always be controlled in the flaw state for 50 mm gauge length of interest in Reference Examples 1 to 3.

In Table 1, it can be seen that high-quality precursor fiber bundles for carbon fiber are obtained because Examples 1 to 4 satisfy any of equations (1) to (3). Furthermore, it can be seen that in Examples 2 and 4 additionally satisfying equation (4), the lifetime of filter is also good. In Table 2, Examples 1 to 4 produce high-quality carbon fiber bundles.

TABLE 1

| | Spinning condition | Filter Spec | | | | | Spinning result | |
| --- | --- | --- | --- | --- | --- | --- | --- | --- |
| | Filtration speed A (cm/hour) | Filtration accuracy B (μm) | Filter thickness C (μm) | Filter basis weight D (g/m$^2$) | Determination in equation (1) D − 600/(α × β) ≥ 0 | Determination in equation (4) B ≥ 3 | Quality of precursor fiber bundle for carbon fiber | Lifetime of filter |
| Example 1 | 3 | 1 | 800 | 2500 | Satisfy | Not satisfy | A | B |
| Example 2 | 3 | 9 | 3200 | 6400 | Satisfy | Satisfy | A | A |
| Comparative Example 1 | 3 | 10 | 1600 | 3200 | Not satisfy | Satisfy | B | A |
| Example 3 | 6 | 1 | 800 | 2500 | Satisfy | Not satisfy | A | B |
| Comparative Example 2 | 6 | 9 | 3200 | 6400 | Not satisfy | Satisfy | B | A |
| Example 4 | 6 | 9 | 6400 | 12800 | Satisfy | Satisfy | A | A |
| Comparative Example 3 | 12 | 1 | 800 | 2500 | Not satisfy | Not satisfy | C | C |
| Comparative Example 4 | 12 | 9 | 6400 | 12800 | Not satisfy | Satisfy | B | B |

TABLE 2

| | Carbon fiber bundle | | | | | | | | |
|---|---|---|---|---|---|---|---|---|---|
| | Tensile strength of strands (GPa) | Tensile modulus of strands (GPa) | Ratio n/N:Gauge length of 10 mm (%) | Ratio n/N:Gauge length of 50 mm (%) | Applied stress dependence Δω/Δσ of peak top position ω (cm⁻¹/GPa) | Mean single fiber diameter (μm) | Specific gravity | E × d/W (GPa) | Quality of carbon fiber bundle |
| Example 1 | 8.6 | 337 | 20 | 60 | 2.9 | 5.1 | 1.80 | 16.0 | A |
| Example 2 | 8.5 | 337 | 20 | — | 2.9 | 5.1 | 1.80 | 16.0 | A |
| Comparative Example 1 | 8.2 | 337 | 43 | — | 2.9 | 5.1 | 1.80 | 16.0 | B |
| Example 3 | 8.5 | 337 | 23 | — | 2.9 | 5.1 | 1.80 | 16.0 | A |
| Comparative Example 2 | 8.3 | 337 | 40 | — | 2.9 | 5.1 | 1.80 | 16.0 | B |
| Example 4 | 8.5 | 337 | 17 | — | 2.9 | 5.1 | 1.80 | 16.0 | A |
| Comparative Example 3 | 7.3 | 337 | 77 | — | 2.9 | 5.1 | 1.80 | 15.8 | C |
| Comparative Example 4 | 7.2 | 337 | 80 | 62 | 2.9 | 5.1 | 1.80 | 15.8 | B |
| Reference Example 1 | 6.9 | 363 | 40 | — | 1.1 | 5.0 | 1.73 | 12.0 | B |
| Reference Example 2 | 6.8 | 270 | 40 | — | 2.9 | 7.0 | 1.79 | 12.0 | B |
| Reference Example 3 | 9.0 | 362 | 37 | — | 2.9 | 3.2 | 1.80 | 15.0 | C |
| Reference Example 4 | 7.2 | 310 | 43 | — | 2.9 | 5.4 | 1.79 | 14.5 | B |

The invention claimed is:

1. A carbon fiber bundle,
   wherein
   a ratio (n/N) of a number n of pairs where a flaw of 50 nm in size or more is present on at least one of fracture surfaces forming the pair to a total number N of pairs of fiber fracture surfaces selected at random after performing a single fiber tensile test for a gauge length of 10 mm is 35% or less, and
   a mean single-fiber diameter is 4.3 μm or more, and
   a tensile strength of strands is 8.0 GPa or more.

2. The carbon fiber bundle according to claim 1, wherein the mean single-fiber diameter is 5.0 μm or more.

3. The carbon fiber bundle according to claim 1, wherein a specific gravity is 1.78 to 1.85.

4. The carbon fiber bundle according to claim 1, wherein when a Raman spectrum is measured while applying a uniaxial tensile stress σ to a single fiber, an applied stress dependence Δω/Δσ of a peak top position (ω) of a G band appearing around 1600 cm⁻¹ is 2.0 cm⁻¹/GPa or more.

5. The carbon fiber bundle according to claim 1, wherein a product (E× d/W) of the (ratio d/W) of the mean single-fiber diameter (d) and a loop diameter (W) just before loop fracture evaluated by a single-fiber loop test, and a tensile elastic modulus (E) evaluated by a tensile test for resin-impregnated strands is 14.6 GPa or more.

* * * * *